United States Patent [19]

Fischer

[11] Patent Number: 4,981,904

[45] Date of Patent: Jan. 1, 1991

[54] METALLIC REFLECTIVE SPRAY-COATABLE COMPOSITIONS

[76] Inventor: Larry C. Fischer, 5919 N. 45th St., Phoenix, Ariz. 85018

[21] Appl. No.: 363,700

[22] Filed: Jun. 9, 1989

[51] Int. Cl.$^5$ ............................................. C08L 67/00
[52] U.S. Cl. ..................................... 524/601; 524/605; 524/608; 525/50; 525/165; 525/166; 525/168; 525/177; 525/246; 525/437; 525/445; 525/451
[58] Field of Search ..................... 524/601, 605, 608; 525/50, 165, 166, 168, 177, 246, 437, 445, 451

[56] References Cited

U.S. PATENT DOCUMENTS 4,529,772  7/1985  Druschke et al. ................... 524/555
4,571,363  2/1986  Culbertson et al. ................ 428/332

Primary Examiner—John Kight, III
Assistant Examiner—Sam A. Acquah
Attorney, Agent, or Firm—Jerome J. Norris

[57] ABSTRACT

Stable spray-coatable, water base composition having about 2 percent solids, that dries into glittering film having plurality of reflective surfaces resistant to flaking, comprising: a blend of a surfactant free first solution comprising, butyl methacrylate, butyl acrylate, 2-ethylhexyl acrylate, glacial methacrylic acid and styrene; a blend of a self-crosslinking second solution comprising, 2-ethylhexyl acrylate, butyl methacrylate, glacial methacrylic acid, styrene and at least one crosslinking polymer; a thickener gel; transparent polyethylene terephthalate chips on which a color imparting or reflective material has been vacuum deposited and cured fast by an epoxy resin and ammonia.

12 Claims, No Drawings

METALLIC REFLECTIVE SPRAY-COATABLE COMPOSITIONS

FIELD OF THE INVENTION

The present invention relates to a method of preparing easily usable stable, spray-coatable water base compositions that dry into a glittering film having a plurality of reflective surfaces that are substantially resistant to flaking.

BACKGROUND OF THE INVENTION

In the preparation of coating compositions in which coloring agents such as pigments are used to impart colors of varying shades and tones having plurality of reflective surfaces, a major problem encountered is how to get the pigmented particles or globules evenly dispersed so that the pigmented particles or globules suspended in the composition are not sheared during mixing or upon application of the composition to a substrate. If the pigmented particles or globules are sheared at either of these stages, a break-up of the particles results and this causes intimate mixing or coavlescence of the pigmented particles or globules, with the resultant undesirable effect of a lack of a glittering film having a plurality of reflective surfaces.

On the other hand, when the mixing or blending, or size and physical configuration of the pigments in these compositions are such that they are not susceptible to shearing and break-up, the compositions are either not sprayable, or if they are sprayable the composition runs off of the substrate, and the dried glittering film having a plurality of reflective surfaces is not resistant to flaking.

Accordingly, there is a need in the art for stable, water-base coating compositions that are spray-coatable and capable of drying into glittering films having a plurality of reflective surfaces that are substantially resistant to flaking.

There is a further need in the art as to how to produce a stable, spray-coatable, water-base coating composition that dries into a glittering film having a plurality of reflective-surfaces, that are resistant to flaking under conditions of interior and exterior use.

The present invention provides a process for overcoming the above-mentioned shortcomings and disadvantages by producing a stable, spray-coatable water base composition that dries into a glittering film having a plurality of reflective surfaces that are substantially resistant to flaking.

SUMMARY OF THE INVENTION

In general, the shortcomings and disadvantages encountered in attempting to obtain stable, spray-coatable water base compositions that dry into glittering films having a plurality of reflective surfaces that are resistant to flaking are accomplished by: (1) blending equal parts by volume of a surfactant free first solution comprising, butyl methacrylate, butyl acrylate, 2-ethylhexyl acrylate, glacial methacrylic acid and styrene, with about equal parts by volume of a surfactant containing self-crosslinking second solution comprising, 2-ethylhexyl acrylate, butyl methacrylate, glacial methacrylic acid, styrene and at least one cross-linking polymer; (2) blending water into the mixture formed in step (1) until about a 22 percent solids mixture is obtained; (3) blending a thickener gel into the mixture formed in step (2) until a heavy cream is obtained; and (4) blending into the heavy cream formed in step (3), transparent polyethylene terephthalate chips onto which a color imparting or reflective material has been vacuum deposited and cured fast by an epoxy resin.

The thickener gel which is added in step (3) is prepared by adding water to carboxypolymethylene under high shear mixing for at least about 45 minutes until about a 4 percent by weight solids mixture is obtained. The mixture is then diluted with water to a 2 percent solids mixture, and ammonia is added in gradually until a thickener gel is formed.

The combination of these ingredients added in the sequence described provides the principal advantage of a ready premixed, water base, metallic glitter coating that is sprayable onto a variety of substrates.

DETAILED DESCRIPTION OF THE INVENTION

The water base coating composition is prepared by: (1) blending about equal parts by volume of a surfactant free first solution comprising, butyl methacrylate, butyl acrylate, 2-ethylhexyl arcylate, glacial methacrylic acid and styrene, with about equal parts by volume of a surfactant containing self-crosslinking second solution comprising, 2-ethylhexyl acrylate, butyl methacrylate, glacial methacrylic acid, styrene and at least one cross-linking polymer; (2) blending water into the mixture formed in step (1) until about a 22 percent solids mixture is obtained; (3) blending a thickener gel into the mixture formed in step (2) until a heavy cream is obtained; and (4) blending into the heavy cream formed in step (3), transparent polyethylene terephthalate chips onto which a color imparting or reflective material has been vacuum deposited and cured fast by an epoxy resin.

The manner of preparing the thickener gel in step (3) is important to obtaining a stable, spray coatable, water-base composition having glitter chips. It has been found that the thickener gel must be prepared by adding carboxypolymethylene to water at ambient temperatures under high shear mixing at up to about 1500 rpm for at least about 45 minutes until about a 4 percent by weight solids mixture is obtained; whereupon water is added until about a 2 percent solids mixture is obtained. Small amounts of a 28% aqueous ammonia solution is then added until a thickened gel is formed. A sufficient amount of the thickener gel is added slowly with blending to the mixture of step (2) until a heavy cream is formed. It is at this stage that transparent polyethylene terephthalate chips onto which a color imparting or reflective material has been vacuum deposited and cured fast by an epoxy resin, is added with stirring until a mixture is obtained having a viscosity of between about 75 and about 150 poise.

Compositions having viscosities between these values are spray-coatable using a simple "hopper" or texture gun at pressures between about 30 to about 50 p.s.i.

The following examples will serve to illustrate the invention in greater detail.

EXAMPLE 1

Water base glitter coating composition without carboxypolymethylene thickener gel.

500 parts of a 30 percent solids surfactant free premixed solution containing about equal amounts by volume of butyl methacrylate, butyl acrylate, 2-ethylhexyl acrylate, glacial methacrylic acid and styrene is blended at ambient temperatures with 500 parts of a 44 percent solids self-crosslinking premixed solution containing about equal parts by volume of 2-ethylhexyl acrylate, butyl methacrylate, glacial methacrylic acid, styrene, and at least one cross-linking polymer and about 0.16 percent by weight of the surfactant Igepol CO-630*. Water is added to the blend until about a 22 percent solids mixture is obtained. Square-shaped transparent polyethylene terephthalate chips of particle sizes of 0.15"×0.008"×0.00045" on which reflective aluminum foil has been vacuum deposited and cured fast by an epoxy resin is added with stirring until about 4% by weight of the mixture is attributable to the chips.

*Igepol CO-63) is the trademark for a surfactant composition available from the GAF Corporation of New York, N.Y.

It was observed that the chips settled out of the mixture and the mixture was of such liquidity that it flowed off of a paint brush. When the mixture was placed in a texture spray gun and sprayed at about 35 p.s.i. onto a vertically disposed wood wall, the mixture rapidly flowed down the wall, and upon drying, the few flakes of aluminum chips remaining provided only a negligible reflective surface. Also, the few chips remaining intact on the wall were easily susceptible to flaking upon slight hand rubbing. It was therefore concluded that, at best, only a very weak bond had formed between the wood substrate and the water base mixture

EXAMPLE 2

Water base glitter coating composition with specially prepared carboxypolymethylene thickener gel.

Same as Example 1, except that, after the 22 percent solids mixture is obtained, a thickener gel formed by adding water to carboxypolymethylene at ambient temperature under high shear mixing of about 1400 r.p.m. for about 50 minutes until a 4% by weight solids mixture is formed.

The mixture is diluted with water down to a 2% solids mixture, whereupon small aliquots of a 28% aqueous ammonia solution is added until a thickened gel is formed. The gel is added in small increments with blending until a heavy cream is formed. The transparent polyethylene terephthalate chips are added with stirring to obtain a mixture that contains about 4% by weight of the chips.

The chips did not settle out of the mixture, and the mixture was of a viscosity such that it did not flow off of a paint brush. Upon placing this mixture in a texture spray gun, and spraying at 35 p.s.i. onto a vertically disposed wood wall, the mixture showed no tendency to flow down or off of the wall. Upon drying, all of the chips were intact on the wall, the film was characterized by a plurality of reflective surfaces, and these surfaces were substantially resistant to flaking upon brisk hand rubbing. Therefore, it was concluded that a firm bond had formed between the coating and the wood substrate.

During the blending step (4) or before, if it appears that foaming is developing, a defoamer may be added in concentrations up to about 1.0 lb per 100 gallons of the mixture, and while any defoamer is capable of serving in this capacity in the context of the invention, it is preferred the *Colloid 840 be used, as it has been found to be compatible with the pigment and foil formulations, and it does not float to the film surface or cause "fisheyes" or "orange-peel" type problems.

| *COLLOID 840 PROPERTIES: | |
|---|---|
| Appearance | Opaque off-white liquid |
| Activity | 100% |
| Specific Gravity @ 25° C. | 1,014 |
| Density @ 25° C. | 8.4 lbs./gallon |
| Viscosity (Brockfield) (#2 spindle @ 30 rpm) | 500 cps. |
| Flash Point (PMCC) | 179° C. |
| Stability | Excellent |

It has been found that the amount of chips can vary between about 0.5% to about 7% by weight of the composition, and that, for sprayability, the composition should have a viscosity between about 75 to about 150 poise.

Moreover, the invention is operable with chips having dimensions as small as about 0.004×0.004×0.00045 up to chips having dimensions of about 0.035×0.035×0.00045.

While the invention has been shown and described with respect to detailed embodiments thereof, it will be understood by those skilled in the art that various changes in form and detail thereof may be made without departing from the spirit and scope of the claimed invention.

What is claimed is:

1. A method of preparing a stable, spray-coatable, water-base composition that dries into a glittering film having a plurality of reflective surfaces that are substantially resistant to flaking, comprising:
   (1) blending about equal parts by volume of about a 30 percent solids, surfactant free first premixed solution comprising, butyl methacrylate, butyl acrylate, 2-ethylhexyl acrylate, glacial methacrylic acid and styrene with about equal parts by volume of about a 44 percent solids, self-crosslinking second premixed solution comprising, 2-ethylhexyl arcylate, butyl methacrylate, glacial methacrylic acid, styrene and at least one cross-linking polymer;
   (2) blending water into the mixture formed in step (1) until about a 22 percent solids mixture is obtained;
   (3) blending a thickener gel into the mixture formed in step (2) until a heavy cream is obtained; and
   (4) blending into the heavy cream formed in step (3) transparent polyethylene terephthalate chips onto which a color imparting or reflective material has been vacuum deposited and cured fast by an epoxy resin, to obtain a spray-coatable composition; said thickener gel being formed by adding water to carboxypolymethylene under high shear mixing for at least about 45 minutes until about a 4 percent solids mixture is obtained, diluting the mixture with water to obtain about a 2 percent solids mixture and adding ammonia to said 2 percent solids mixture to form a thickener gel.

2. The process of claim 1, wherein said cross-linking polymer is selected from the group consisting of N-methylol acrylamide, glycidyl acrylate and glycidyl methacrylate.

3. The process of claim 2, wherein the color imparting material is a pigment.

4. The process of claim 2, wherein the reflective material is aluminum foil.

5. The process of claim 4, wherein said aluminum foil chips have a square configuration and particle sizes of about 0.015"×0.008"×0.00045".

6. The process of claim 3, wherein said pigment has a square configuration and particle sizes of about 0.15"×0.008"×0.00045".

7. A stable spray-coatable, water base composition having a viscosity of between about 75 to about 150 poise and about 2 percent solids, said composition being capable of drying into a glittering film having a plurality of reflective surfaces that are substantially resistant to flaking, comprising: a blend of about equal parts by volume of a surfactant free first premixed solution comprising, butyl methacrylate, butyl acrylate, 2-ethylhexyl acrylate, glacial methacrylic acid and styrene; a blend of about equal parts by volume of a self-crosslinking second premixed solution comprising, 2-ethylhexyl acrylate, butyl methacrylate, glacial methacrylic acid, styrene and at least one cross-linking polymer; carboxypolymethylene thickener gel; transparent polyethylene terephthalate chips onto which a color imparting or reflective material has been vacuum deposited and cured fast by an epoxy resin, and ammonia.

8. The composition of claim 7, wherein said crosslinking polymer is selected from the group consisting of N-methylol acrylimide, glycidyl acrylate and glycidyl methacrylate.

9. The composition of claim 8, wherein the color imparting material is a pigment 10. The composition of claim 8, wherein the reflective material is aluminum foil.

11. The composition of claim 10, wherein said aluminum foil-chips have a square configuration and particle sizes of about 0.015"×0.008"×0.00045".

12. The composition of claim 9, wherein said pigment has a square configuration and particle sizes of about 0.015"×0.008"×0.00045".

* * * * *